(12) United States Patent
Paulson et al.

(10) Patent No.: US 10,569,869 B2
(45) Date of Patent: *Feb. 25, 2020

(54) COMPACT FOLDING YOKE IN A FOLDING ROTOR BLADE ASSEMBLY

(71) Applicant: Bell Helicopter Textron Inc., Fort Worth, TX (US)

(72) Inventors: Jared Mark Paulson, Fort Worth, TX (US); Tyler Wayne Baldwin, Keller, TX (US); Kyle Thomas Cravener, Watauga, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 259 days.

This patent is subject to a terminal disclaimer.

(21) Appl. No.: 15/845,810

(22) Filed: Dec. 18, 2017

(65) Prior Publication Data

US 2019/0185151 A1 Jun. 20, 2019

(51) Int. Cl.
| | | |
|---|---|---|
| F04F 5/16 | (2006.01) |
| F04F 5/46 | (2006.01) |
| F04D 17/16 | (2006.01) |
| F04D 25/06 | (2006.01) |
| F04D 25/08 | (2006.01) |
| F04D 25/16 | (2006.01) |
| F04D 29/42 | (2006.01) |
| F04D 29/66 | (2006.01) |
| F01D 11/00 | (2006.01) |
| F01D 5/08 | (2006.01) |
| F01D 5/06 | (2006.01) |
| F01D 25/12 | (2006.01) |
| F02C 3/04 | (2006.01) |
| F16J 15/16 | (2006.01) |
| F16J 15/447 | (2006.01) |
| B64C 27/50 | (2006.01) |
| B64C 3/56 | (2006.01) |
| B64C 27/48 | (2006.01) |
| B64C 29/00 | (2006.01) |

(52) U.S. Cl.
CPC ............... B64C 27/50 (2013.01); B64C 3/56 (2013.01); B64C 27/48 (2013.01); B64C 29/0033 (2013.01)

(58) Field of Classification Search
CPC ..... B64C 27/50; B64C 27/52; B64C 29/0008; B64C 27/33; B64C 27/35; B64C 27/37; B64C 11/28; B64C 3/56; B64C 29/0033
See application file for complete search history.

(56) References Cited

U.S. PATENT DOCUMENTS

| | | |
|---|---|---|
| 2,623,713 A | 12/1952 | Foster |
| 2,658,576 A | 11/1953 | Mosinskis |

(Continued)

OTHER PUBLICATIONS

Paulson, Jared Mark, "U.S. Appl. No. 15/845,720" filed Dec. 18, 2017.

(Continued)

Primary Examiner — Eldon T Brockman
(74) Attorney, Agent, or Firm — Winstead PC

(57) ABSTRACT

A folding yoke comprising a bilateral center yoke pivotally connected to separate foldable yoke arms permits rotor blade fold about a single through bolt connection inboard of a set of bearings. In use, the compact folded arrangement of the rotor blades reduces folded aircraft dimensions in response to ever increasing restricted storage space parameters.

20 Claims, 7 Drawing Sheets

(56) References Cited

U.S. PATENT DOCUMENTS

| | | | |
|---|---|---|---|
| 3,026,942 A * | 3/1962 | Cresap | B64C 27/54 |
| | | | 416/114 |
| 3,153,455 A | 10/1964 | Mosinskis | |
| 3,625,631 A | 12/1971 | Covington, Jr. et al. | |
| 3,652,185 A | 3/1972 | Cresap et al. | |
| 3,967,918 A | 7/1976 | Mouille et al. | |
| 4,252,504 A | 2/1981 | Covington et al. | |
| 4,257,739 A | 3/1981 | Covington et al. | |
| 4,268,222 A | 5/1981 | Bernard | |
| 4,427,340 A | 1/1984 | Metzger et al. | |
| 4,522,563 A | 6/1985 | Reyes et al. | |
| 4,691,878 A | 9/1987 | Vaughan et al. | |
| 5,031,858 A | 7/1991 | Schellhase et al. | |
| 5,059,094 A | 10/1991 | Robinson et al. | |
| 5,096,380 A | 3/1992 | Byrnes et al. | |
| 5,337,974 A | 8/1994 | Rumberger et al. | |
| 5,358,381 A | 10/1994 | Covington et al. | |
| 5,645,400 A | 7/1997 | Hunter et al. | |
| 6,036,442 A | 3/2000 | Certain et al. | |
| 7,530,790 B2 | 5/2009 | Cabrera et al. | |
| 8,360,727 B2 | 1/2013 | Stamps et al. | |
| 9,156,545 B1 | 10/2015 | Fenny et al. | |
| 9,169,010 B2 | 10/2015 | Foskey et al. | |
| 9,499,262 B2 | 11/2016 | Foskey et al. | |
| 2004/0026564 A1 | 2/2004 | Romani et al. | |
| 2013/0149151 A1 | 6/2013 | Rauber et al. | |
| 2014/0271199 A1 | 9/2014 | Maresh et al. | |
| 2014/0271222 A1 | 9/2014 | Maresh et al. | |
| 2015/0125300 A1 * | 5/2015 | Stamps | B64C 27/41 |
| | | | 416/134 A |
| 2016/0152329 A1 | 6/2016 | Tzeng et al. | |
| 2017/0144746 A1 | 5/2017 | Schank et al. | |
| 2017/0320567 A1 | 11/2017 | Miller et al. | |
| 2018/0229830 A1 | 8/2018 | Foskey et al. | |
| 2018/0244377 A1 | 8/2018 | Chan | |

OTHER PUBLICATIONS

Paulson, Jared Mark, "U.S. Appl. No. 15/845,876" filed Dec. 18, 2017.

Paulson, Jared Mark, "U.S. Appl. No. 15/845,928" filed Dec. 18, 2017.

Paulson, Jared Mark, "U.S. Appl. No. 15/845,967" filed Dec. 18, 2017.

Paulson, Jared Mark, "U.S. Appl. No. 15/846,011" filed Dec. 18, 2017.

Cravener, Kyle Thomas, "U.S. Appl. No. 15/963,516" filed Apr. 26, 2018.

Paulson, Jared Mark, "U.S. Appl. No. 16/016,280" filed Jun. 22, 2018.

* cited by examiner

COMPACT FOLDING YOKE IN A FOLDING ROTOR BLADE ASSEMBLY

CROSS-REFERENCE TO RELATED APPLICATIONS

This patent application is related to U.S. Published Patent Application 2019/0185150, entitled "Split Yoke In A Folding Rotor Blade Assembly," U.S. Published Patent Application 2019/0185152 entitled "Compact Folding Yoke With Flexible Yoke Arms In A Folding Rotor Blade Assembly," U.S. Published Patent Application 2019/0185141, entitled "Dual Blade Fold Bolts And Inboard Centrifugal Bearing In A Folding Rotor Blade Assembly," U.S. Published Patent Application 2019/0185,142, entitled "Folding Spindle And Bearing Assembly In A Folding Rotor Blade Assembly," and U.S. Published Patent Application 2019/0185153, entitled "Outboard Centrifugal Force Bearing With Inboard Blade Fold Axis In A Folding Rotor Blade Assembly." Each patent application identified above is filed on the same date as this patent application and is incorporated herein by reference in its entirety.

BACKGROUND

This section provides background information to facilitate a better understanding of the various aspects of the disclosure. It should be understood that the statements in this section of this document are to be read in this light, and not as admissions of prior art.

Rotorcraft and tiltrotor aircraft are often transported or stored on vessels or in areas where storage space is limited. In order to reduce the space that each aircraft occupies such that the maximum number of aircraft can be accommodated within the limited storage space, the blade assemblies of some rotor systems can be folded so that each rotor blade is generally parallel with each other in order to reduce the overall profile of the blade assembly. Typically, each rotor blade is folded about a single pivot point positioned outboard of the yoke that attaches the rotor blade to the central drive mast. The single pivot point is also necessarily outboard of an essential set of inboard and outboard bearings that connect the rotor blade to the yoke. The distance between the inboard and outboard bearings is dependent on aircraft configuration where each configuration has an optimal distance for that particular aircraft's loads and dynamics. As a result, in order to not interfere with the bearings and preserve the optimal distance between the bearings, the pivot point of each rotor blade is typically at least that optimal distance out from the rotor blade's inboard connection to the yoke.

In an effort to transport or store larger numbers of rotorcraft and tiltrotor aircraft, current naval vessels have reduced the allotted storage space available for each aircraft. Present rotor blade folding systems cannot accommodate the reduced space parameters. This requirement necessitates a tighter grouping of the rotor blades than is currently available by prior art rotor blade folding systems.

SUMMARY

An example of a folding yoke for a rotor blade assembly includes a bilateral yoke including an upper plate vertically aligned with a lower plate, an axially aligned hole pair formed through the upper plate and the lower plate, a bolt pivotally connecting a yoke arm to the bilateral yoke through the axially aligned hole pair, and bearings connected to the yoke arm outboard of the bolt.

An example of a rotor blade assembly includes a hub spring operatively connected to a central mast, a bilateral yoke connected to the hub spring, a yoke arm pivotally connected to the bilateral yoke at a pivot point providing a first pivot axis, and bearings connecting the yoke arm to a rotor blade, the bearings positioned on the yoke arm outboard of the pivot point.

An example of a method for folding a rotor blade assembly comprising a yoke arm connected to a rotor blade and connected to a bilateral yoke at a first pivotable connection including a first pivot axis, a pitch horn connected to the rotor blade at a releasable connection and at a second pivotable connection including a second pivot axis, and a set of bearings connected to the yoke arm outboard of the first pivot axis includes pitching the rotor blade, releasing the releasable connection, and rotating the yoke arm about the first pivotable connection and the second pivotable connection.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1A:
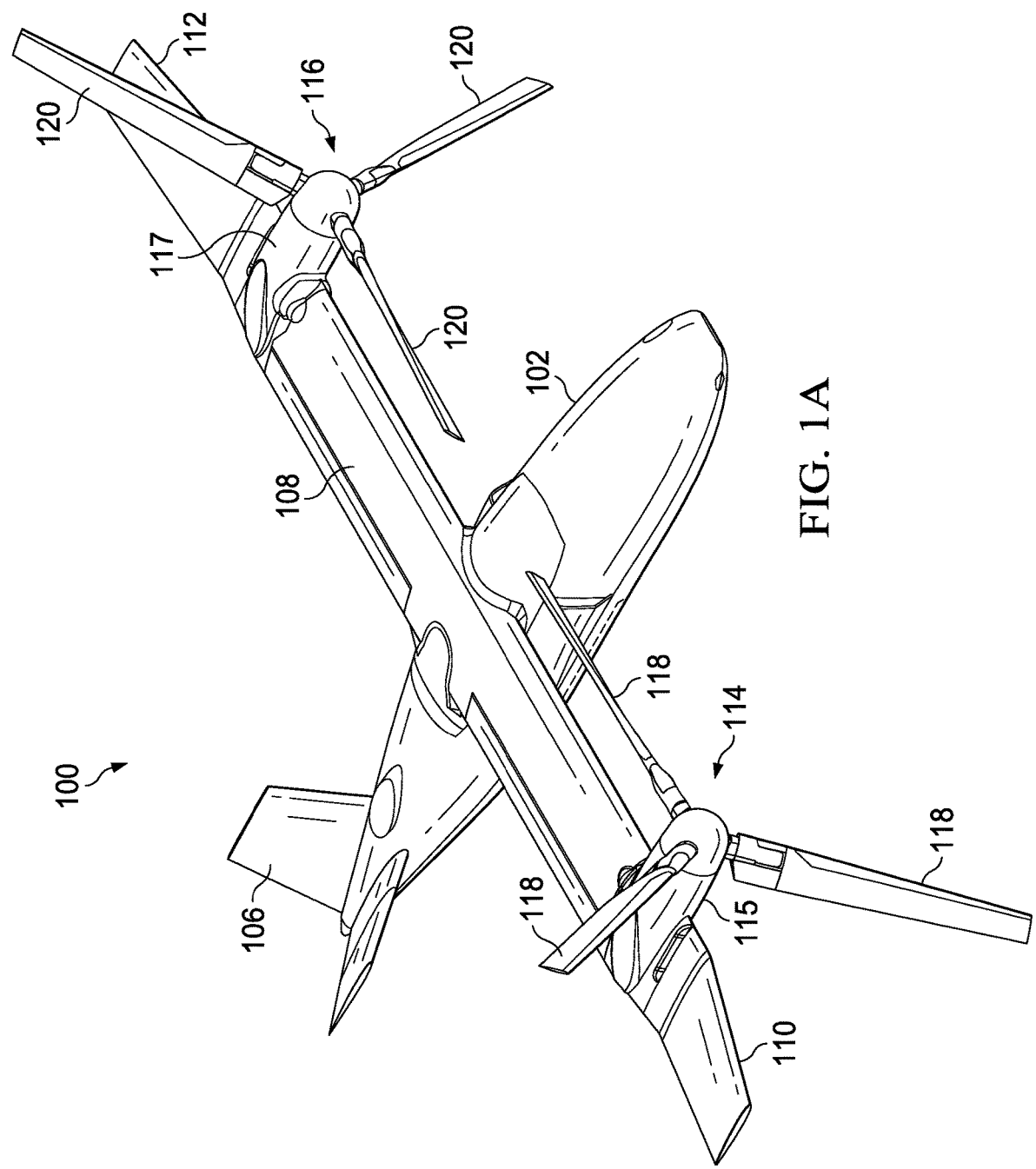
FIG. 1A is a perspective view of a tiltrotor aircraft in a flight ready position according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Figure 1B:
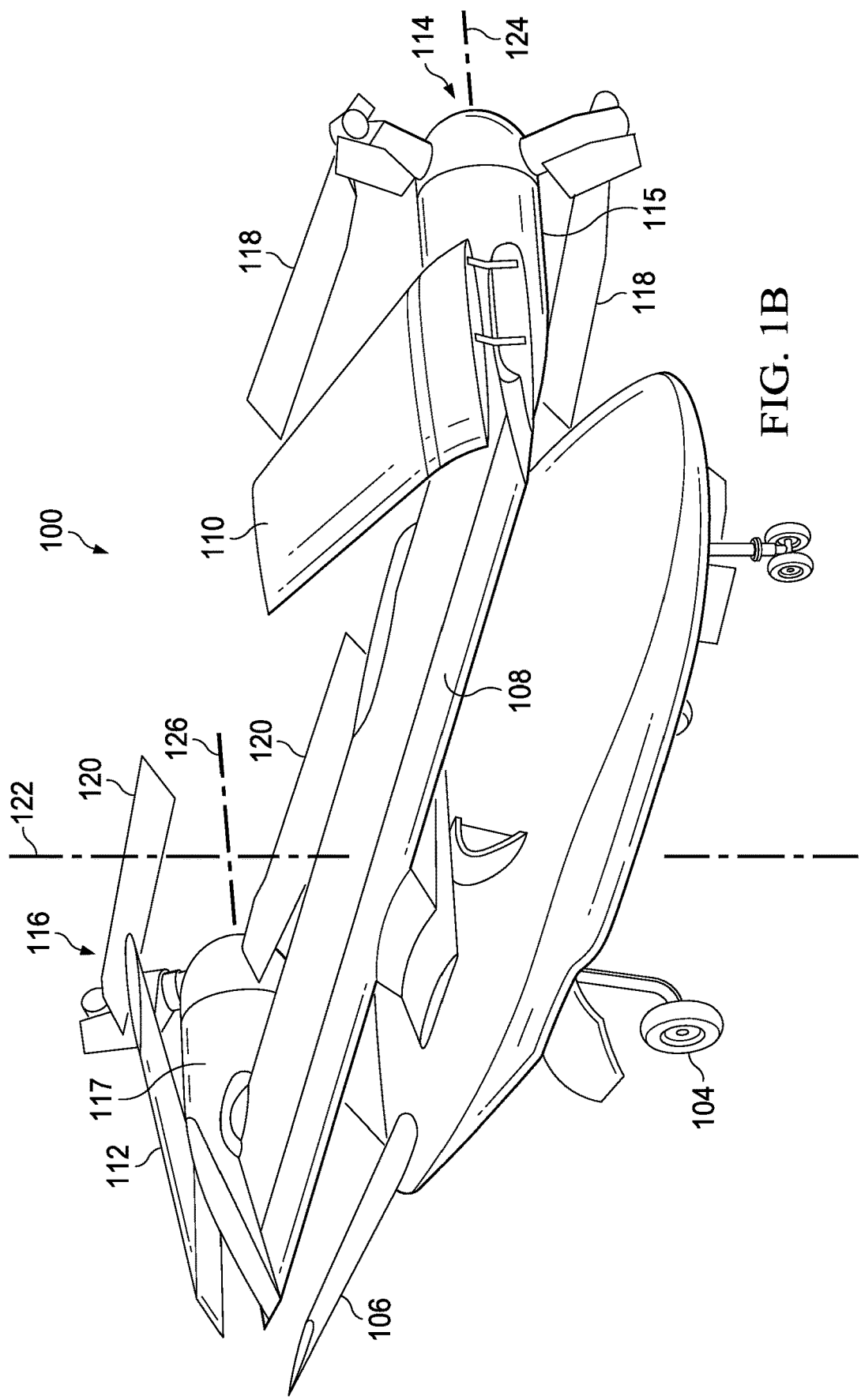
FIG. 1B is a perspective view of a tiltrotor aircraft in a stowed position according to aspects of the disclosure.

Referring to FIGS. 1A and 1B, an illustrative tiltrotor aircraft 100 is shown. Tiltrotor aircraft 100 includes fuselage 102, landing gear 104, tail member 106, wing 108, wing tip 110, wing tip 112, rotor system 114, and rotor system 116. Rotor system 114 is housed within nacelle 115 located on an end portion of wing 108 proximate wing tip 110, while rotor system 116 is housed within nacelle 117 located on an opposite end portion of wing 108 proximate wing tip 112. Wing tip 110 is pivotable at a location on wing 108 outboard of nacelle 115. Wing tip 112 is pivotable at a location on wing 108 outboard of nacelle 117. Nacelles 115 and 117 are pivotable between a helicopter mode where the rotor systems are generally vertical and an airplane mode where the rotor systems are generally horizontal. Nacelle 115 and nacelle 117 are substantially symmetric of each other about fuselage 102. Rotor system 114 includes a plurality of foldable rotor blades 118. Rotor system 116 includes a plurality of foldable rotor blades 120. Rotor blades 118 and 120 may rotate in opposite directions to cancel the torque associated with the operation of each rotor system 114 and 116. The angle of the pivotable nacelles 115 and 117 relative to the wing, as well as the pitch of rotor blades 118 and 120, can be adjusted in order to selectively control direction, thrust, and lift of tiltrotor aircraft 100. Further, rotor systems 114 and 116 are illustrated in the context of tiltrotor aircraft 100; however, a singular rotor system with foldable rotor blades can be implemented on other non-tilting rotor and helicopter rotor systems. It should also be appreciated that teachings from tiltrotor aircraft 100 may apply to other aircraft such as airplanes and unmanned aircraft which would benefit from folding rotor blades.

Fuselage 102 represents the body of tiltrotor aircraft 100 and may be coupled to rotor systems 114 and 116 such that the rotor systems with rotor blades 118 and 120 may move tiltrotor aircraft 100 through the air. Landing gear 104 supports tiltrotor aircraft 100 when tiltrotor aircraft 100 is landing or when tiltrotor aircraft 100 is at rest on the ground. Vertical axis 122 is generally perpendicular to the longitudinal axis of the wing and is generally positioned at the intersection of the fuselage and the wing. FIG. 1A represents tiltrotor aircraft 100 in operational flying position in an airplane mode. FIG. 1B represents tiltrotor aircraft 100 in a stowed position where rotor blades 118 have been folded generally parallel with each other and rotor blades 120 have been folded generally parallel with each other in order to reduce the dimensions of the aircraft to whatever degree is required in response storage space restrictions. In the stowed position, wing 108 is swivelled approximately 90° to generally align with fuselage 102.

Generally each rotor system includes a mast driven by a power source. A rotor system includes a yoke connected to the mast and rotor blades indirectly connected to the yoke with bearings. There may be inboard bearings connecting a cuff or grip of a rotor blade to the yoke proximate the mast and outboard bearings connecting the rotor blade to an outboard end of a yoke arm. Other combinations of inboard and outboard bearings with or without cuffs or grips are possible as well as the removal of one or the other bearings. The bearings accommodate forces acting on the rotor blades allowing each rotor blade to flex with respect to the yoke/mast and other rotor blades. The weight of the rotor blades and the lift of rotor blades may result in transverse forces on the yoke and other components. Examples of transverse forces may include forces resulting from flapping and coning of the rotor blades. Flapping generally refers to the up-and-down movement of a rotor blade positioned at a right angle to the plane of rotation. Coning generally refers to the upward flexing of a rotor blade due to lift forces acting on the rotor blade. The rotor blades may be subject to other forces, such as axial, lead/lag, and feathering forces. Axial forces generally refer to the centrifugal force on the rotor blades during rotation of the rotor blades. Lead and lag forces generally refer to forces resulting from the horizontal movement of the rotor blades about a vertical pin occurring if, for example, the rotor blades do not rotate at the same rate as the yoke. Feathering forces generally refer to forces resulting from twisting motions that cause a rotor blade to change pitch. The power source, mast, and yoke are components for transmitting torque. The power source may include a variety of components including an engine, a transmission, and differentials. In operation, the mast receives torque from the power source and rotates the yoke. Rotation of the yoke causes the rotor blades to rotate with the mast and yoke.

Figure 2A:
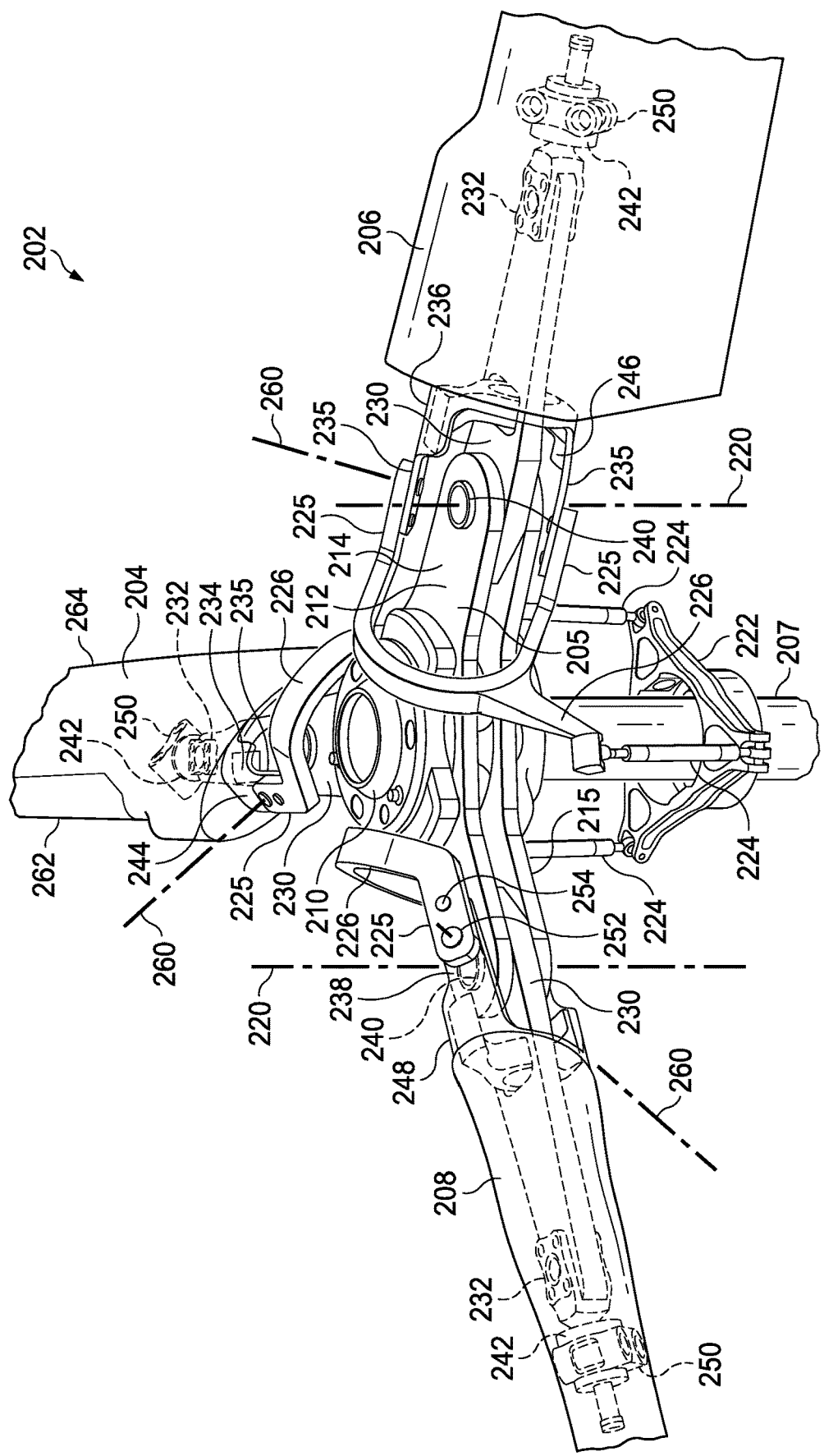
FIG. 2A is a partial perspective view of a blade assembly in an unfolded position according to one or more aspects of the disclosure.
Figure 2B:
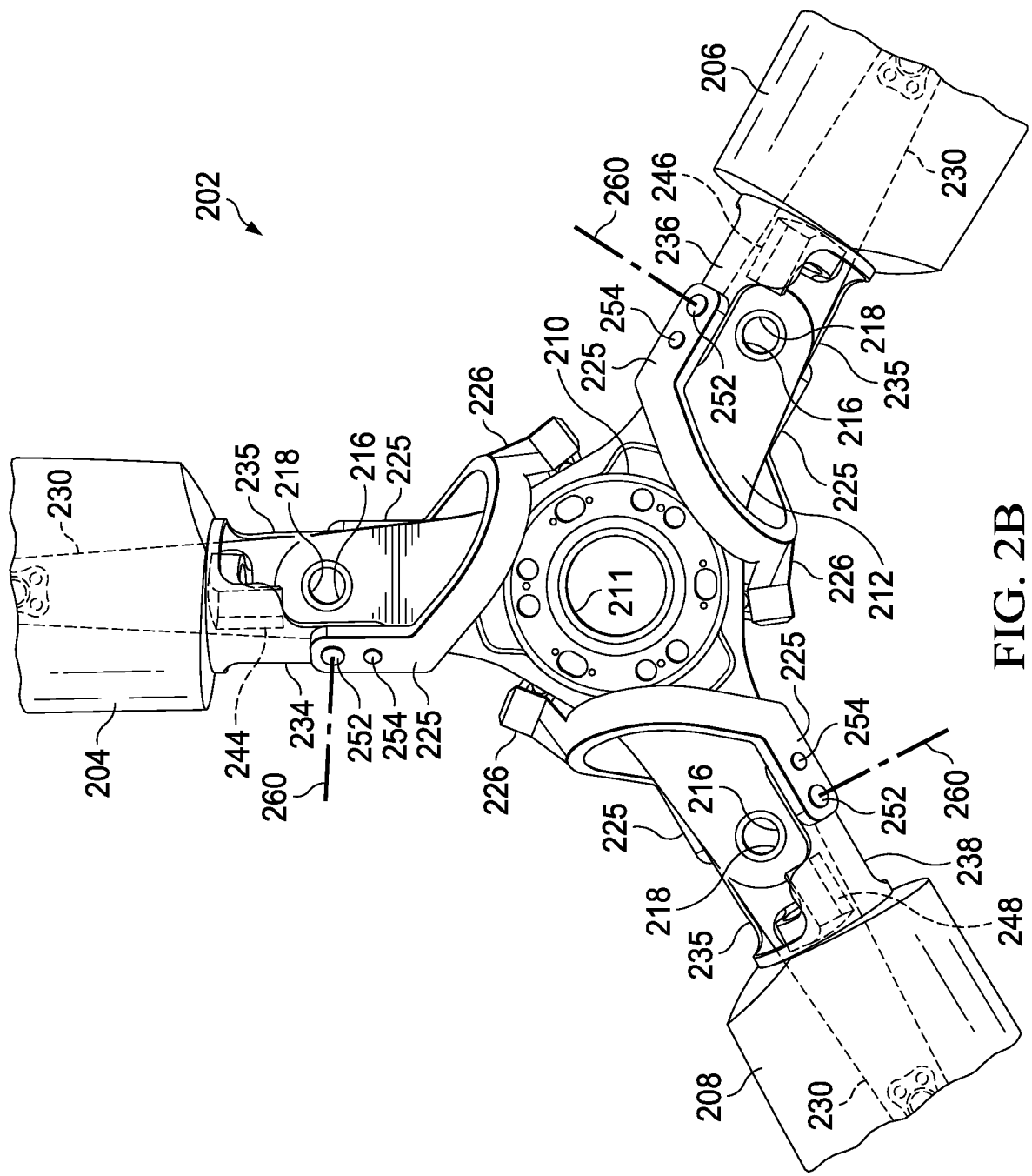
FIG. 2B is a partial top view of a blade assembly in an unfolded position according to one or more aspects of the disclosure.

Referring to FIGS. 2A and 2B, blade assembly 202 is shown in an unfolded position. Each rotor system 114 and 116 comprises a separate blade assembly. In the interest of clarity, a single blade assembly is described herein with the understanding that tiltrotor aircraft 100 comprises a pair of similarly configured blade assemblies. Blade assembly 202 is shown in an unfolded position. In the unfolded position, each rotor blade 204, 206, and 208 is generally equally spaced from each other around the mast. For example in the three rotor blade configuration shown, 120° separates each rotor blade. It should also be appreciated that teachings regarding blade assembly 202 can apply to blade assemblies having greater or fewer rotor blades.

Hub spring 210 is connected to mast 207 through central opening 211. Folding yoke 205 includes bilateral center yoke 212 and a plurality of yoke arms 230. Bilateral center yoke 212 is mounted to hub spring 210. Bilateral center yoke 212 includes a central hole axially aligned with central opening 211 sized for engagement with mast 207. Bilateral center yoke 212 is comprised of upper plate 214 spaced from and vertically aligned with lower plate 215. Upper plate 214 defines a plurality of holes 216 equally spaced radially about the central hole. Lower plate 215 defines a plurality of holes 218 equally spaced radially about the central hole. Holes 216 are axially aligned with holes 218. Each pair of aligned holes 216 and 218 has a common central axis 220. Yoke arms 230 are pivotally attached to bilateral center yoke 212 with bolts 240 through each pair of aligned holes 216 and 218. Bolts 240 also share central axis 220. Each yoke arm 230 is "foldable" with respect to bilateral center yoke 212 about central axis 220. Bolts 240 provide a pivot point about central axis 220 for each yoke arm with respect to the bilateral center yoke. Each yoke arm 230 is positioned between upper plate 214 and lower plate 215. Each yoke arm 230 is in double shear condition between upper plate 214 and lower plate 215. The double shear condition prevents any rotational moment about the connection of each yoke arm to the bilateral center yoke created by centrifugal forces acting on the rotor blade during blade assembly rotation.

Rotor blades 204, 206, and 208 each have leading edge 262 and trailing edge 264. Rotor blades 204, 206, and 208 include integrally formed split cuffs 234, 236, and 238, respectively. Each split cuff 234, 236, and 238 includes a pair of aligned flanges 235. Flanges 235 of the split cuffs are mounted to inboard beams 244, 246, and 248, respectively. The inboard beams house inboard bearings which are connected to each yoke arm 230. The inboard bearings allow the rotor blades to flex in response to shear forces on the rotor blades due to rotation of the blade assembly. Clamps 232 are mounted on each yoke arm 230 on the end of the yoke arm opposite the inboard beam. Outboard bearings 242 extend between clamps 232 and outboard beams 250 on each yoke arm 230. Outboard beams 250 are connected to rotor blades 204, 206, and 208. Outboard bearings 242 respond to centrifugal force acting on the rotor blades due to rotation of the blade assembly about the mast. The inboard and outboard bearings are generally elastomeric bearings constructed from a rubber type material that absorb vibration and provide for limited movement of the rotor blades relative to the folding yoke and mast. The centrifugal force ("CF") load path on each rotor blade is from the rotor blade, to the outboard beam, to the yoke arm, through the bolt 240, and to the bilateral center yoke.

Swash plate 222 is connected to mast 207. Pitch links 224 extend from swash plate 222 and connect to pitch horns 226. Each pitch horn includes a pair of aligned arms 225. Arms 225 of each pitch horn 226 are connected to flanges 235 of each split cuff 234, 236, and 238. The arms of each pitch horn are connected to the flanges of each split cuff with a pair of axially aligned pivot pins 252 and a pair of axially aligned releasable pins 254. The axially aligned pivot pins 252 share a common central axis 260. The swash plate, pitch links, and pitch horns are operatively connected to an actuator to pitch the rotor blades relative to the folding yoke about the central longitudinal axis of each rotor blade. Each rotor blade is free to rotate or "pitch" about its central longitudinal axis with respect to its connected yoke arm. This rotation allows each rotor blade to pitch through an angle in the range of 45° to 90°.

Figure 3:
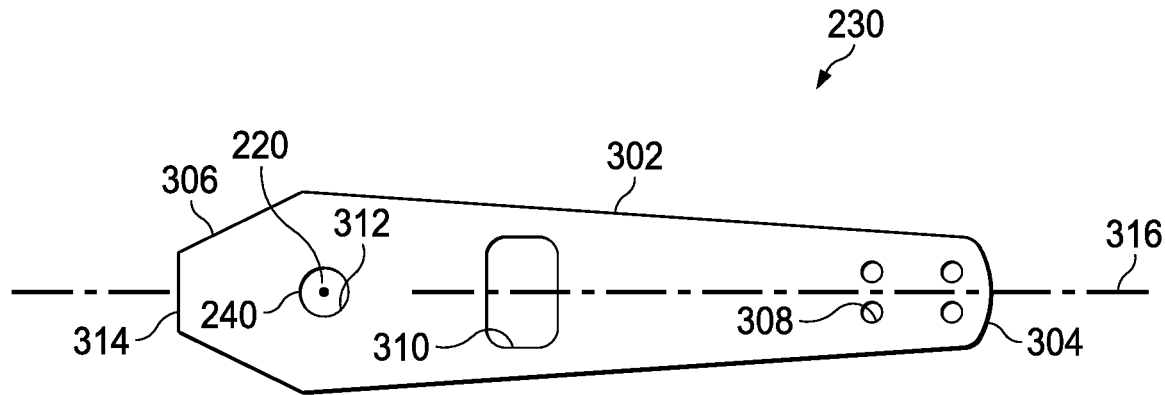
FIG. 3 is a top view of a yoke arm according to one or more aspects of the disclosure.

FIG. 3 is illustrative of yoke arm 230. In the interest of clarity, a single yoke arm is described herein with the understanding that a blade assembly comprises a plurality of similarly configured yoke arms. Yoke arm 230 includes body 302 having outboard end 304 opposite inboard end 306. Outboard end 304 includes a pattern of mounting holes 308 sized and spaced to mount clamp 232 (FIG. 2A) to yoke arm 230. Oblong opening 310 is positioned through body 302 between inboard end 306 and outboard end 304. Oblong opening 310 is sized to accept inboard beams and inboard bearings. Oblong opening 310 is the mounting point for the inboard beams and inboard bearings to the yoke arm. Hole 312 is positioned through body 302 proximate inboard end 306. Hole 312 is axially aligned with holes 216 and 218 in the bilateral center yoke and is sized to engage bolt 240. Hole 312, holes 216 and 218, and bolt 240 all share common central axis 220. Inboard end 306 defines flat tip 314. Flat tip 314 is sized and shaped to engage and be locked/unlocked by a lock mechanism (e.g., tang) attached to bilateral center yoke 212 between upper plate 214 and lower plate 215. The lock mechanism locks each yoke arm in the unfolded and folded positions and when unlocked, allows each yoke arm to rotate relative to the bilateral center yoke. Yoke arm 230 further includes central longitudinal axis 316. Central longitudinal axis 316 perpendicularly intersects central axis 220.

Figure 4A:
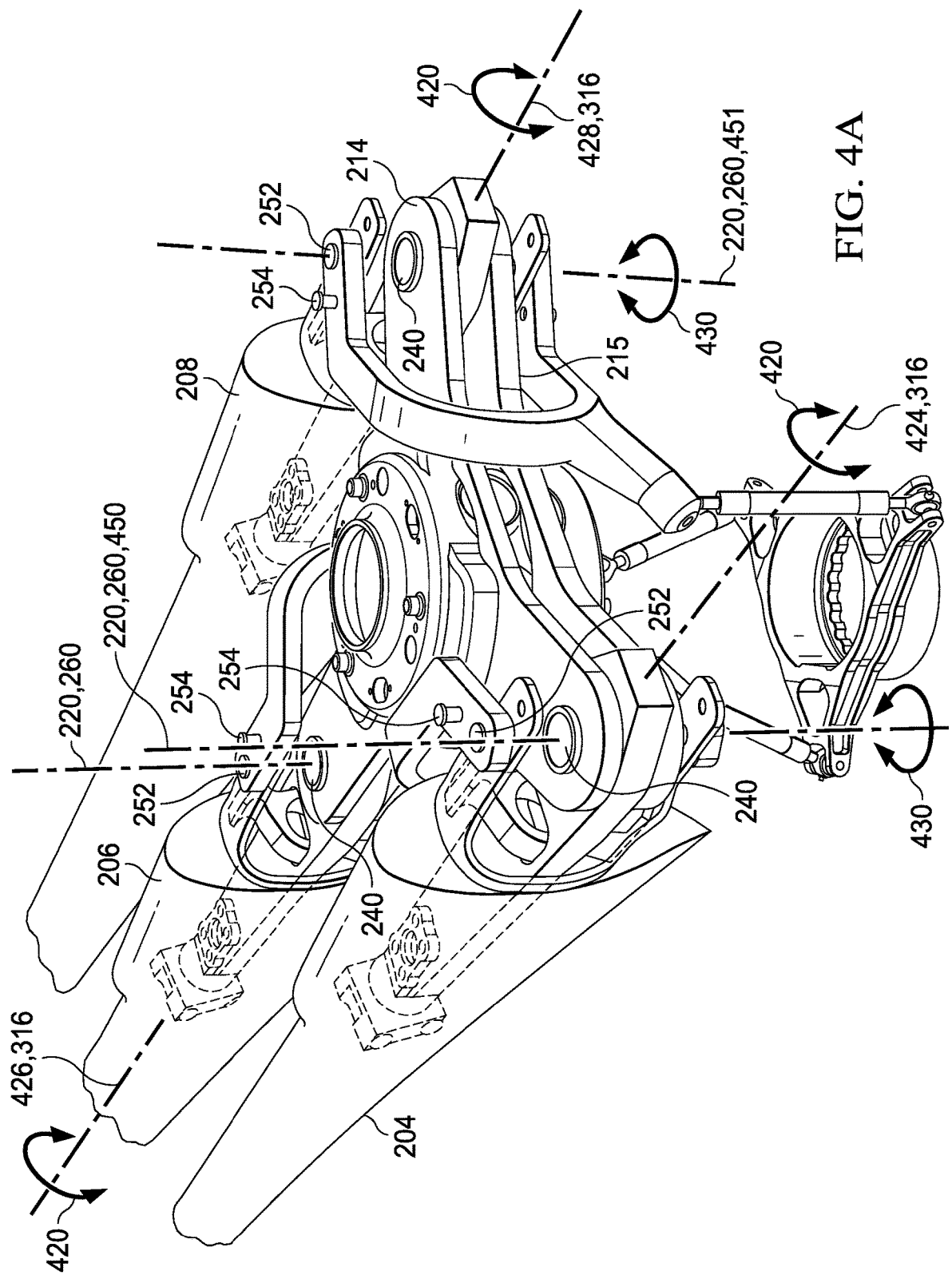
FIG. 4A is a partial perspective view of a rotor blade assembly in a folded position according to aspects of the disclosure.

Referring to FIG. 4A, blade assembly 202 is shown in a folded position. Rotor blade 204 has central longitudinal axis 424. Rotor blade 206 has central longitudinal axis 426. Rotor blade 208 has central longitudinal axis 428. Central longitudinal axes 424, 426, and 428, are coaxial with central longitudinal axis 316 of each yoke arm 230 (FIG. 3). Each rotor blade is free to rotationally pitch about its central longitudinal axis in direction 420 with respect to its connected yoke arm. Rotor blades 204, 206, and 208 are pitched about their respective longitudinal axis 424, 426, and 428 in direction 420 until central axes 220 of holes 216 and 218 and bolts 240 are coaxially aligned with the central axes 260 of pivot pins 252. Coaxially aligned central axes 220 and 260 form pivot axis 450 for rotor blade 204 with respect to bilateral center yoke 212. Coaxially aligned central axes 220 and 260 form pivot axis 451 for rotor blade 208 with respect to bilateral center yoke 212. When central axes 220 and 260 are coaxially aligned, rotor blades 204, 208 can rotate about pivot axes 450, 451 in direction 430. Pivot axes 450, 451 provided by coaxially aligned central axes 220 and 260 are on the centrifugal force ("CF") path of the respective rotor blade.

Figure 4B:
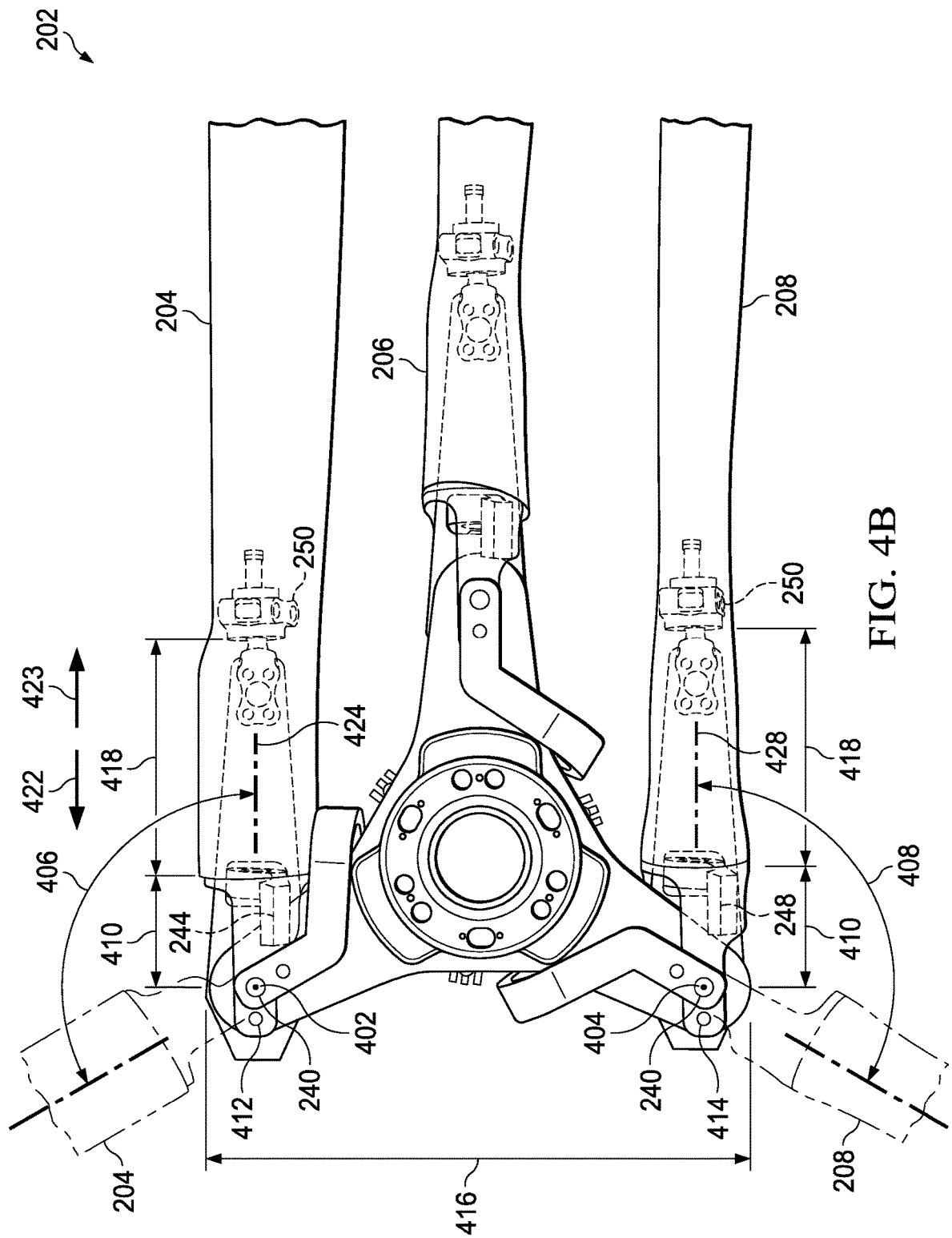
FIG. 4B is a top view of a rotor blade assembly in a folded position according to aspects of the disclosure.

Referring to FIG. 4B, blade assembly 202 is shown in a folded position. Unfolded rotor blade 204 and unfolded rotor blade 208 are depicted in shadow. Rotor blade 204 is rotated in direction 430 at pivot point 402 about pivot axis 450 through angle 406. Rotor blade 208 is rotated in direction 430 at pivot point 404 about pivot axis 451 through angle 408. Axially aligned pivot pins 252 at pivot points 402 and 404 provide pivot axes for the rotor blade with respect to the pitch horn. Bolts 240 at pivot points 402 and 404 provide the pivot axis for each yoke arm and its respective rotor blade with respect to bilateral center yoke. Actuators are operatively connected to the rotor blades to facilitate movement of the rotor blades about the pivot points. Angles 406 and 408 may be in the range of 90° to 180°. Physical stops or proximity sensors signal the actuators to cease rotational movement of the rotor blades.

Rotor blade 204 cannot rotate at pivot point 402 until central axis 220 is aligned with central axis 260 and the axially aligned releasable pins 254 at connection point 412 that connect the aligned arms 225 of each pitch horn to flanges 235 of each split cuff are pulled. Rotor blade 208 cannot rotate at pivot point 404 until central axis 220 is aligned with central axis 260 and the axially aligned releasable pins 254 at connection point 414 that connect the aligned arms 225 of each pitch horn to flanges 235 of each split cuff are pulled. Actuators are connected to releasable pins 254 at connection points 412 and 414 to pull the releasable pins at connection points 412 and 414 free from engagement with the split cuffs. While releasable pins 254 are pulled, pivot pins 252 remain engaged with arms 225 of the pitch horns and flanges 235 of the split cuffs.

Pivot points 402 and 404 are positioned inboard of inboard beams 244 and 248 of rotor blades 204 and 208, respectively. Pivot points 402 and 404 are located a distance 410 in the inboard direction 422 from inboard beams 244 and 248 of rotor blades 204 and 208, respectively. Distance 410 is measured along the central longitudinal axis 424 and 428 of rotor blades 204 and 208, respectively. Pivot points 402 and 404 are positioned on central longitudinal axes 424 and 428. Central longitudinal axes 424 and 428 may also be referred to as blade pitch change axes. The pivot point of each rotor blade positioned inboard of the inboard beams allows folded profile 416 to be less than if the pivot point were outboard of the outboard beam 250. Distance 418 is the spacing between inboard beam 244, 248, which houses the inboard bearing, and outboard beam 250, which houses the outboard bearing. Distance 418 is an optimal distance between inboard and outboard bearings for a rotor blade assembly of a particular aircraft. The distance is dependent on the particular aircraft's loads and dynamics. Inboard direction 422 points toward the drive mast of a blade assembly while outboard direction 423 points away from the drive mast along the longitudinal axis of a rotor blade.

Figure 5:
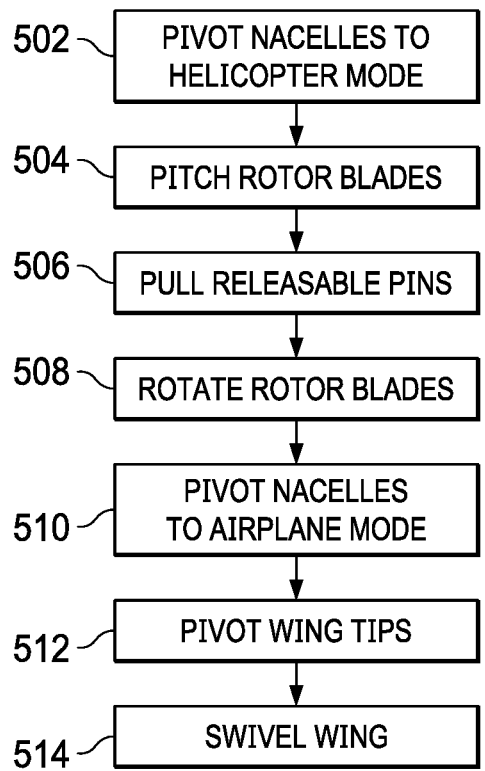
FIG. 5 is a flowchart of the actions performed in converting a tiltrotor aircraft from a flight ready position to a stowed position according to aspects of the disclosure.

Referring to FIG. 5, the actions performed in converting tiltrotor aircraft 100 from a flight ready position to a stowed position are shown. At block 502, nacelles 115 and 117 which house rotor systems 114 and 116, respectively, are pivoted to helicopter mode. Each nacelle is rotated nose up to approximately 90° nacelle angle. A 90° nacelle angle is where the longitudinal axis of the nacelle is generally vertical relative to the ground. The blade assemblies of each rotor system are generally horizontal. At block 54, each rotor blade is pitched about its central longitudinal axis such that central axis 220 of bolt 240 and holes 216 and 218 is axially aligned with central axis 260 of pivot pins 252 forming pivot axes 450, 451. In this position, the leading edge of each rotor blade is generally facing upward. This is referred to as indexing the rotor blades. Actuators operatively connected to pitch links 224 and pitch horns 226 facilitate the change in pitch of the rotor blades. At block 506, releasable pins 254 connecting the pitch horns to the to-be-folded rotor blades are pulled. Actuators operatively connected to the releasable pins facilitate temporary removal of the pins such that each pitch horn is now connected to the split cuffs by a single pair of axially aligned pivot pins 252. The position and quantity of identified to-be-folded rotor blades can vary depending on rotor assembly configuration (e.g., two of the three blades in the illustrated embodiments are folded). At block 508, the rotor blades and attached yoke arms are rotated about the respective pivot axes 450, 451 with respect to the bilateral center yoke. Prior to rotation, the lock mechanism attached to the bilateral center yoke is operative to unlock the yoke arm relative to the bilateral center yoke. Actuators operatively connected to the rotor blades facilitate rotation of the rotor blades about bolts 240. The rotor blades are rotated toward the fuselage until the rotor blades are generally parallel with each other at which point physical stops or proximity sensors signal the actuators to cease movement of the rotor blades. At block 510, nacelles 115 and 117 are pivoted to airplane mode. Each nacelle is rotated to approximately 0° nacelle angle. A 0° nacelle angle is where the longitudinal axis of the nacelle is generally horizontal relative to the ground. The blade assemblies of each rotor system remain generally horizontal. At block 512, wing tips 110 and 112 are pivoted toward the fuselage. At block 514, wing 108 is swivelled about vertical axis 122 to lie above and generally align with the fuselage. The entire sequence of converting tiltrotor aircraft 100 from an operational flight ready position to a stowed position can be completed in a range of 1 to 2 minutes in a wind of up to at least 60 knots. It can be interrupted or stopped at any point to facilitate maintenance. Manual operation is possible in the event of a system failure. It is to be understood that several of the previous actions may occur simultaneously or in different order. The order of actions disclosed is not meant to be limiting.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A rotor blade assembly, comprising:
   a hub spring operatively connected to a central mast;
   a bilateral yoke connected to the hub spring;
   a yoke arm pivotally connected to the bilateral yoke at a pivot point providing a first pivot axis;
   bearings connecting the yoke arm to a rotor blade, the bearings positioned on the yoke arm outboard of the pivot point; and
   a pitch horn connected to the rotor blade with a releasable pin and with a pivot pin providing a second pivot axis.

2. The rotor blade assembly of claim 1, wherein the yoke arm is generally parallel with an adjacent yoke arm when the yoke arm is rotated about the pivot point to a folded position.

3. The rotor blade assembly of claim 2, wherein the bilateral yoke further comprises:
   an upper plate vertically aligned with a lower plate; and
   the yoke arm is connected to the bilateral yoke between the upper plate and the lower plate.

4. The rotor blade assembly of claim 2, wherein the bearings comprise an inboard beam, housing an inboard bearing, connected to the yoke arm and to the rotor blade outboard of the pivot point.

5. The rotor blade assembly of claim 4, wherein the bilateral yoke further comprises:
   an upper plate vertically aligned with a lower plate; and
   the yoke arm is connected to the bilateral yoke between the upper plate and the lower plate.

6. The rotor blade assembly of claim 2, wherein the bearings comprise an outboard beam, housing an outboard bearing, connected to a tip of the yoke arm and to the rotor blade outboard of the pivot point.

7. The rotor blade assembly of claim 1, wherein the bilateral yoke further comprises:
   an upper plate vertically aligned with a lower plate; and
   the yoke arm is connected to the bilateral yoke between the upper plate and the lower plate.

8. The rotor blade assembly of claim 1, wherein upon removal of the releasable pin and coaxial alignment of the first pivot axis with the second pivot axis, the yoke arm can rotate about the pivot point.

9. The rotor blade assembly of claim 1, wherein the bearings further comprise:
   an inboard beam, housing an inboard bearing, connected to the yoke arm and to the rotor blade outboard of the pivot point.

10. The rotor blade assembly of claim 1, wherein the bearings further comprise:
    an outboard beam, housing an outboard bearing, connected to a tip of the yoke arm and to the rotor blade outboard of the pivot point.

11. A method for folding a rotor blade assembly comprising a yoke arm connected to a rotor blade and connected to a bilateral yoke at a first pivotable connection including a first pivot axis, a pitch horn connected to the rotor blade at a releasable connection and at a second pivotable connection including a second pivot axis, and a set of bearings connected to the yoke arm outboard of the first pivot axis, comprising:

pitching the rotor blade;

releasing the releasable connection; and rotating the yoke arm about the first pivotable connection and the second pivotable connection.

12. The method of claim 11, wherein pitching the rotor blade includes axially aligning the first pivot axis with the second pivot axis.

13. The method of claim 12, wherein the rotor blade assembly is connected to a nacelle pivotally mounted to a wing; and pivoting the nacelle to a 90° nacelle angle.

14. The method of claim 13, further comprising subsequent to rotating the yoke arm, pivoting the nacelle to a 0° nacelle angle.

15. The method of claim 12, wherein the rotor blade assembly is connected to a nacelle pivotally mounted to a wing, further comprising, pivoting a wing tip of the wing.

16. The method of claim 12, wherein the rotor blade assembly is mounted to a wing and the wing is mounted to a fuselage, further comprising, subsequent to rotating the yoke arm, swivelling the wing about its vertical axis to align with the fuselage.

17. The method of claim 11, wherein:

the rotor blade assembly is connected to a nacelle pivotally mounted to a wing; and pivoting the nacelle to a 90° nacelle angle.

18. The method of claim 17, further comprising subsequent to rotating the yoke arm, pivoting the nacelle to a 0° nacelle angle.

19. The method of claim 11, wherein the rotor blade assembly is connected to a nacelle pivotally mounted to a wing, further comprising, pivoting a wing tip of the wing.

20. The method of claim 11, wherein the rotor blade assembly is mounted to a wing and the wing is mounted to a fuselage, further comprising, subsequent to rotating the yoke arm, swivelling the wing about its vertical axis to align with the fuselage.

* * * * *